United States Patent [19]

Best et al.

[11] Patent Number: 5,772,920
[45] Date of Patent: Jun. 30, 1998

[54] U.V. ABSORBER COMPOSITIONS

[75] Inventors: Michael Best, Charlotte, N.C.; Jean-Luc Mura, Rixheim; Francis Palacin, Riedisheim, both of France

[73] Assignee: Clariant Finance (BVI) Limited, Tortola, Virgin Islands (Br.)

[21] Appl. No.: 679,840

[22] Filed: Jul. 15, 1996

Related U.S. Application Data

[63] Continuation-in-part of Ser. No. 501,335, Jul. 12, 1995, abandoned.

[51] Int. Cl.$^6$ .............................. C09K 15/22; C08K 5/34
[52] U.S. Cl. ................................. 252/403; 8/490; 8/557; 8/560; 524/91; 524/310; 524/311; 524/377; 524/378
[58] Field of Search ............................. 524/91, 377, 378, 524/310, 311; 252/403; 8/490, 557, 560

[56] References Cited

U.S. PATENT DOCUMENTS

| | | |
|---|---|---|
| 3,076,782 | 2/1963 | Mohr et al. . |
| 3,159,646 | 12/1964 | Milionis . |
| 3,253,921 | 5/1966 | Sawdey . |
| 3,692,525 | 9/1972 | Hartigan . |
| 3,705,805 | 12/1972 | Nittel . |
| 3,738,837 | 6/1973 | Kuwabura . |
| 3,761,272 | 9/1973 | Mannens . |
| 3,794,493 | 2/1974 | Sobel . |
| 3,813,255 | 5/1974 | Mannens . |
| 3,962,123 | 6/1976 | Di Battiste et al. . |
| 4,195,999 | 4/1980 | Adachi . |
| 4,386,037 | 5/1983 | Baumann . |
| 4,557,730 | 12/1985 | Bennett et al. . |
| 4,668,235 | 5/1987 | Evans et al. . |
| 4,696,888 | 9/1987 | Buhr . |
| 4,790,959 | 12/1988 | Sasaki . |
| 4,964,871 | 10/1990 | Reinert et al. . |
| 5,009,669 | 4/1991 | Jollenbeck et al. . |
| 5,057,562 | 10/1991 | Reinert . |
| 5,190,565 | 3/1993 | Berenbaum . |

FOREIGN PATENT DOCUMENTS

| | | |
|---|---|---|
| 0345111 | 12/1989 | European Pat. Off. . |
| 0 354 174 A1 | 2/1990 | European Pat. Off. . |
| 0 378 054 A2 | 7/1990 | European Pat. Off. . |
| 0 445 076 A2 | 9/1991 | European Pat. Off. . |
| 0 474 595 A1 | 11/1995 | European Pat. Off. . |
| 0 683 264 A2 | 11/1995 | European Pat. Off. . |
| 2581 672 | 11/1986 | France . |
| 2543 146 | 5/1976 | Germany . |
| 62-19552 | 3/1981 | Japan . |
| 56-31086 | 4/1987 | Japan . |
| 62-18676 | 4/1987 | Japan . |
| 494 060 | 5/1966 | Switzerland . |
| 2174731 | 11/1986 | United Kingdom . |
| 2 187 746 | 9/1987 | United Kingdom . |
| 2187 746 | 9/1987 | United Kingdom . |

OTHER PUBLICATIONS

CA vol 95, No. 24, Dec. 1981, 205338z, JP A 81 82 830.
CA vol 102, No. 26, Jun. 1984, 168259q, JP A 59 216 979.
CA vol 100, No. 26, Jun. 1984, 211576p, JP A 59 09 287.
CA vol. 67, 1967 74196y, Ger 1 217 383, eq to CH 494 060, supra.

*Primary Examiner*—Veronica P. Hoke
*Attorney, Agent, or Firm*—Hesna J. Pfeiffer; Scott E. Hanf

[57] ABSTRACT

Compositions of water insoluble U.V. absorbers can be improved by the addition of a non-ionic surfactant which is an addition product of ethylene oxide or propylene oxide or both ethylene oxide and propylene oxide, and a mixture of fatty alcohols, fatty acids or fatty esters having 7–20 carbon atoms, preferably 14–18 carbon atoms or either tristyrylphenol or distyrylphenol. Such compositions have a good storage stability and excellent shear stability when the substrate to be dyed is a yarn which is in packed form.

8 Claims, No Drawings

U.V. ABSORBER COMPOSITIONS

This is a continuation-in-part of U.S. Ser. No. 08/501,335, filed Jul. 12, 1995, now abandoned.

The invention relates to compositions of water-insoluble or very sparingly soluble U.V. absorbers that are stable to storage under both cold and warm storage conditions.

GB Patent 2,187,746 discloses compositions suitable for applying U.V. absorbers of the benzotriazole series to a substrate in the form of a dispersion in water.

Improved compositions of this type have now been found according to the present invention which surprisingly demonstrate improved stability and performance compared to those of GB 2,187,746. The compositions of the present invention comprise a 4-part composition comprising a mixture of a sparingly soluble U.V. absorber, water, a dispersing agent and a surfactant, whereas those of GB 2,187,746 comprise a 3-part composition, comprising the U.V. absorber, water and a dispersing agent. GB 2,187,746 also discloses the optional presence of non-ionic surfactants which are addition products of $C_{1-12}$alkylphenol and alkylene oxides. A preferred surfactant is the addition product of $C_{1-12}$alkylphenol (preferably nonylphenol) and a $C_{2-3}$. alkyleneoxide.

The present invention provides a composition (A) comprising, based on the total weight of said composition:

a) 20 to 45% of a insoluble or sparingly soluble U.V. absorber of the 2-(2'-hydroxyphenyl)-benzotriazole series having an average particle size of less than 5 μm;

b) 7 to 25% of a dispersing agent which is a condensation product of a sulphonated tolylether and formaldehyde;

c) 0.5 to 10% of a non-ionic surfactant which is an addition product of ethylene oxide or propylene oxide or both ethylene oxide and propylene oxide, and a mixture of fatty alcohols, fatty acids, fatty amides or fatty esters having 7–20 carbon atoms, preferably 14–18 carbon atoms or either tristyrylphenol or distyrylphenol;

d) and water.

In a preferred embodiment of the present invention there is provided a composition (B) comprising, based on the weight of the total composition:

a) 20 to 45% of an insoluble or sparingly soluble U.V. absorber of the 2-(2'-hydroxyphenyl)-benztriazole series having an average particle size of less than 5 μm;

b) 7 to 20% of a dispersing agent which is a condensation product of a sulphonated tolylether and formaldehyde;

c) 1 to 6% of a non-ionic surfactant which is an addition product of ethylene oxide or propylene oxide or both ethylene and propylene oxide and tristyrylphenol;

d) and water.

In a further preferred embodiment of the present invention there is provided a composition (C) comprising, based on the weight of the total composition:

a) 20 to 45% of an insoluble or sparingly soluble U.V. absorber of the 2-(2-hydroxyphenol)-benzotriazole series having an average particle size of less than 5 μm;

b) 7 to 25% of a dispersing agent which is a condensation product of sulphonated tolylether and formaldehyde;

c) 0.5 to 10% of a non-ionic surfactant which is an addition product of 1 mole of fatty alcohols with 14–18 carbon atoms and 10–50 moles ethylene oxide or propylene oxide, or a total of 10–50 moles ethylene oxide and propylene oxide;

d) and water.

Compositions according to the invention may comprise, based on total weight of said composition, one or more additional components selected from the group of:

e) up to 1.6% of a solubilizing agent f) 0.1 to 0.2% of a buffer g) 0.1 to 0.3% of an antifouling agent h) 0.1 to 1.0% of an antifoaming agent.

Preferred dispersing agents are those commercially available (for example BAYKANOL SL), as described in U.S Pat. No. 4,386,037, especially Example 15. The disclosure of U.S. Pat. No. 4,386,037 is incorporated herein by reference. The preferred amount of formaldehyde used per mole of sulphonated tolylether is from 0.2 to 3.0 moles.

Preferred U.V absorbers of the 2-(2'-hydroxyphenyl)-benzotriazole series are those described in Japanese Kokai 56-31084 and Swiss Patent 494,060. The Kokai and the Swiss Patent are incorporated herein by reference.

The diameter of the U.V. absorbers used in a composition according to the invention is generally less than 5 μm. Suitably the particles have a diameter in the range of from 0.1 to 3 μm. Preferably the mean diameter of the U.V. absorbers is less than 1 μm. The mean particle size can be measured by placing a sample on a microscope on which a scale has been superimposed.

In composition (B) the non-ionic surfactant is preferably an addition product of tristyrylphenol and 10–50 moles of ethylene oxide or an addition product of tristyrylphenol and ethylene oxide/propylene oxide. Most preferred is an addition product of tristyrylphenol and 16 moles of ethylene oxide, commercially available as SOPROPHOR BSU (Rhone Poulenc).

In composition (C), the non-ionic surfactant is preferably an addition product of 1 mole of a mixture of fat alcohols having 14–18 carbon atoms and 10–50 moles of ethylene oxide. Most preferred is an addition product of 1 mole of a mixture of fat alcohols having 14–18 carbon atoms and 25–40 moles of ethylene oxide. Different grades of primary alcohols may be used, e.g.

60% $C_{14}$/40% $C_{15}$ (Dobanol 45, Shell)

25–35% $C_{16}$/60–67% $C_{18}$(Orkus)

20–33% $C_{16}$/60–80% $C_{18}$(Laurex CS)

The content of unsaturated alcohol (e.g. oleylalcohol) present, may be up to 25%, but it is not mandatory that such alcohol be present. There may be small amounts of fractions of $C_{\leq 19}$ and $C_{\geq 19}$ present, but these will each be present at less than 5%.

Preferred solubilizing agents are addition products of poly-$C_{1-4}$-alkylene glycols (preferably polypropylene or polyethylene glycol) with propylene oxide and/or ethylene oxide. More preferably the solubilizing agents are the addition products of polypropylene glycol and propylene oxide and ethylene oxide, most preferably those the polyoxypropylene part thereof, having a molecular weight of 1500 to 2500 and comprising 40 to 60% polyoxyethylene units, particularly preferred being "Pluronic" type solubilizing agents.

Preferably the buffer is either sodium hydroxide or phosphoric acid, depending on the acidity of the components.

Preferred antifouling agents are fungicides for example Giv Gard, a commercially available product.

Preferred antifoaming agents are compositions based on silicone oil or alkylenediamides (e.g. of stearic acid), preferably added in amounts of 0.5 to 1.0% by weight of the total composition.

A preferred composition (B) according to the invention is composition ($B_1$) which comprises, based on the weight of the total composition:

a) 20 to 35% of 2-(2'-hydroxy-3'-tert.butyl-5'-methylphenyl)-5-chlorobenzatriazole;
b) 10 to 20% of a dispersing agent which is a condensation product of a ditolylethersulphonate and formaldehyde;
c) 2 to 6% of a surfactant which is the addition product of 1 mole of tristyrylphenol and 16 moles of ethylene oxide;
e) up to 1.6% of a solubilizing agent which is a polymer addition product of polypropylene glycol, propyleneoxide and ethyleneoxide, the polyoxypropylene part thereof having a molecular weight of 1700 to 2300; and 40 to 60% polyoxyethylene units in the polymer;
d) and water.

Another preferred composition (B) according to the invention is composition ($B_2$) which comprises:
a) 35 to 45% of 2-(2'-hydroxy-3'-tert.butyl-5'-methylphenyl)-5-chlorobenzotriazole;
b) 10 to 14% of a dispersing agent which is a condensation product of ditolylethersulphonate and formaldehyde;
c) 2 to 6% of a surfactant which is the addition product of 1 mole tristyrylphenol and 16 moles of ethylene oxide;
e) up to 1.6% of a solubilizing agent which is a polymer addition product of polypropylene glycol, propyleneoxide and ethyleneoxide, the polyoxypropylene part thereof having a molecular weight of 1700 to 2300; and 40 to 60% polyoxyethylene units in the polymer;
d) and water.

A preferred composition (C) according to the invention is ($C_1$) which comprises, based on weight of the total composition:
a) 20 to 35% of 2-(2'-hydroxy-3'-tert.butyl-5'-methylphenyl)-5-chlorobenzotriazole;
b) 10 to 25% of a condensation product of ditolylethersulphonate and formaldehyde;
c) 1 to 5% of the addition product of 1 mole of a mixture of fat alcohols having 16–18 carbon atoms and 40 moles of ethylene oxide
e) up to 1.6% of a solubilizing agent which is a polymer addition product of polypropylene glycol, propyleneoxide and ethyleneoxide, the polyoxypropylene part thereof having a molecular weight of 1700 to 2300; and 40 to 60 polyoxyethylene units in the polymer;
d) and water.

Another preferred composition (C) according to the invention is ($C_2$) which comprises, based on weight of the total composition:
a) 35 to 45% of 2-(2'-hydroxy-3'-tert.butyl-5'-methylphenyl)-5-chlorobenzotriazole;
b) 10 to 14% of a condensation product of ditolylethersulphonate and formaldehyde;
c) 1 to 5% of the addition product of 1 mole of a mixture of fat alcohols having 16–18 carbon atoms and 40 moles of ethylene oxide;
e) up to 1.6% of the addition product of polypropylene glycol, propyleneoxide and ethyleneoxide, the polyoxypropylene part thereof having a molecular weight of 1700 to 2300; and 40 to 60% polyoxyethylene units in the polymer
d) and water.

Preferably the pH of a composition according to the invention is between 4.5 and 5.8, more preferably 5.0 to 5.5.

Compositions according to the invention are suitable for use in dyeing, padding or printing processes preferably in a concentration of 0.5 to 6.0% based on the weight of substrate to be treated. The concentration of the composition depends on the particular components of the dyestuff utilized in the dyeing, padding or printing process and on the desired shade.

Compositions according to the invention have excellent stability to storage, both cold and warm storage and have excellent shear stability under dyeing conditions. The stability to cold storage may be observed by freezing a composition according to the present invention and thereafter allowing the frozen composition to thaw. The compositions of the present invention do not display phase separation during thawing.

In one aspect of the present invention, the compositions are added to the dyeing, padding or printing composition and the thus obtained dyebath, padding liquor or printing paste is used in a conventional dyeing, padding or printing process respectively.

Compositions according to the invention are also suitable as after-treatment compositions being applied by padding, printing or exhaustion techniques, as a 0.5 to 6.0% (the percentages being by weight of the substrate being dyed) dispersion in water. Accordingly, in a further aspect of the present invention, the compositions of the present invention are applied to the substrate after dyeing, padding or printing has been carried out according to a conventional process, such a treatment being referred to as an after-treatment.

Further, according to the invention there is provided a process for dyeing, padding and printing a substrate comprising applying to the substrate 0.1 to 5% of a dye (preferably a disperse dye) and 0.5 to 6% of a composition according to the invention (the percentages being by weight of the substrate being dyed) preferably in an aqueous medium, in a liquor to goods ratio of 10:1 to 60:1.

Substrates dyed with disperse dyes and a composition of a U.V. absorber, the composition being according to the present invention, show excellent light fastness properties.

The invention will now be illustrated by the following examples in which all parts and percentages are by weight and all temperatures are in °C.

EXAMPLES OF COMPOSITIONS (B)

Example 1

The following are mixed together in a vessel:
25.00 parts of 2-(2'-hydroxy-3'-tert.butyl-5'-methylphenyl)-5-chlorobenzotriazole; 14.00 parts of a commercially available condensation product of ditolylether sulphonate and formaldehyde (Baykanol SL);
1.20 parts of commercially available Pluronic P 75 (from BASF/Wyandotte Corp.) [the addition product of propylene glycol and propylene oxide, followed by the further reaction with ethylene oxide; the polyoxypropylene part of the product having a molecular weight of 2050 (approx.) and the polymer having about 50% polyoxyethylene units];
4.00 parts of a commercially available product of 1 mole of tristyrylphenol+16 moles of ethylene oxide (Soprophor BSU);
1.00 part of a commercially available wetting agent (Sandozin NIT fl);
0.20 parts of a commercially available conservation agent (GivGard);

0.05 parts of NaOH; and 54.55 parts of water.

The mixture is then milled in a bead mill with silicoquarzite beads until the average size of the particles of the U.V. absorber is less than 1 μm. This occurs after about 30 minutes. The resulting dispersion is filtered from the silicoquarzite beads.

The resulting concentrate exhibits a good dispersion stability.

Example 2

Example 1 is repeated using the following components:

40.00 parts of 2-(2'-hydroxy-3'-tert.butyl-5-methylphenyl)-5-chlorobenzotriazole;

10.14 parts of a commercially available condensation product of ditolylether sulphonate and formaldehyde;

1.16 parts of commercially available Pluronic P 75;

4.00 parts of a commercially available product of 1 mole of tristyrylphenol+16 moles of ethylene oxide (Soprophor BSU);

1.01 parts of a commercially available wetting agent (Sandozin NIT fl);

0.28 parts of a commercially available conservation agent (GivGard);

0.07 parts of NaOH; and 43.34 parts of water.

Example 3

Example 1 is repeated omitting to add the commercially available Pluronic P 75 and using 55.75 parts water in place of the 54.55 parts of Example 1.

Example 4

Example 1 is repeated, omitting to add the commercially available Pluronic P 75, using 2 parts of a commercially available product of 1 mole of tristyrylphenol+16 moles of ethylene oxide, (rather than 4 parts as in Example 1); and using 57.75 parts water.

Example 5

Example 1 is repeated, omitting to add both the commercially available Pluronic P 75 and the wetting agent (Sandozin NIT fl); and using 56.75 parts water.

Example 6

Example 1 is repeated, omitting to add both the commercially available Pluronic P 75 and the wetting agent (Sandozin NIT fl); using 2 (rather than 4 parts) of a commercially available product of 1 mole of tristyrylphenol+16 moles of ethylene oxide; and using 58.75 parts water.

Example 7 (Comparative Example 1)

Example 1 is repeated, omitting to add the commercially available Pluronic P 75, the wetting agent (Sandozin NIT fl) and the commercially available product of 1 mole of tristyrylphenol+16 moles of ethylene oxide; and using 60.75 parts water.

Example 8 (Comparative Example 2)

Example 1 is repeated using the following components:

25.00 parts of 2-(2'-hydroxy-3'-tert.butyl-5'-methylphenyl)-5-chlorobenzotriazole;

8.00 parts of the commercially available product of 1 mole of tristyrylphenol+16 moles of ethylene oxide (Soprophor BSU), which is the minimum amount necessary in order to obtain a mean particle diameter of 1 μm;

0.28 parts of a commercially available conservation agent (GivGard);

0.07 parts of NaOH; and 66.65 parts of water.

Example 9 (Comparative Example 3)

Example 8 is repeated, using 12 parts of the commercially available product of 1 mole of tristyrylphenol+16 moles of ethylene oxide and 62.65 parts water, in an attempt to further improve the shear stability of the dispersion of Example 8.

Example 10 (Application Example)

A dyebath is prepared using the following components:

0.75% of C.I. Disperse Red 74;

0.75% of the dispersion of Example 1; and 98.50% water.

The pH is brought to 5.0 by the addition of ammonium sulphate/formic acid in a ratio of 10:1.

The above described dyebath (1000 parts) is warmed to 60° in a dyeing autoclave and 100 parts of a polyester fabric (the quality of which is adequate for use as automobile upholstery) is added thereto, the autoclave is closed and the circulating bath is heated to 135°. Dyeing is carried out at 135° for 20 minutes after which the bath is cooled to 80° and the dyed substrate is removed from the bath. It is then washed, reductively cleaned, washed again and dried. The light-fastness of the dyed fabric is substantially better than that dyed without the benztriazole present.

Instead of using 0.75% of the dispersion of Example 1, Application Example 10 can be repeated using 0.75% of the dispersion of any one of the compositions of Examples 2 to 6 above.

Application Examples (Examples 11–18)

Using a fine polyester yarn (Dtex 167f) and a precision winder (density ca. 0.4), a small cross-wound bobbin of 40 g is produced. This bobbin is dyed with one of the dyestuff combinations given below, in a circulation dyeing apparatus (e.g. Colorstar by Zeltex AG, CH). The pressure difference and flow rate are displayed by the dyeing apparatus.

A goods-to-liquor ratio of 1:10, with water of 11° d (German Hardness) is employed.

Each of the dyestuff combinations of examples 11 to 18 comprises:

0.19% C.I Disperse Yellow 86

0.185% C.I Disperse Yellow 42

0.122% C.I Disperse Red 91

0.05% C.I Disperse Blue 56

0.44% C.I Disperse Blue 77 and in addition, each of these combinations comprises 3,5% of one of the dispersions of examples 1–9 above; as is indicated in Table 1 below.

The dyestuff combination is poured over the bobbin, and thereafter a static pressure of 2 bar is applied. At the start of dyeing, a flow rate of 0.61/min is set. Under these conditions, there is initially a differential pressure (internal/external) of ca. 0.05–0.1 bar. The dye liquor is heated to 130° at a rate of 2°/min, and after dyeing for 30 minutes, cooling is effected to 80°, at a rate of 5°/min. During the entire dyeing procedure, the flow rate, the differential pressure and the temperature are recorded by a three-channel recording instrument.

The dispersions of the present invention are evaluated by the following parameters:

maximum pressure difference (internal/external) ($\_P$) bar minimum flow rate (F, 1/min)

levelness of the dyeing (internal/external) (E)

presence of deposits inside the bobbin (A)

The results may be seen from the following Table 1:

TABLE 1

| Application Ex. No. | Dispersion | $\_P_{max}$ | $F_{min}$ | E | A |
|---|---|---|---|---|---|
| 11 | Example 1 | 0.45 | 0.16 | good | no |
| 12 | Example 3 | 0.18 | 0.46 | very good | no |
| 13 | Example 4 | 0.47 | 0.13 | very good | no |
| 14 | Example 5 | 0.10 | 0.37 | very good | no |
| 15 | Example 6 | 0.64 | 0.30 | very good | no |
| 16 | Example 7 | >1.00 | 0.20 | bad | yes |
| 17 | Example 8 | 0.95 | 0.15 | bad | yes |
| 18 | Example 9 | 0.50 | 0.12 | bad | yes |

As may be seen from the table, when a dispersing agent in the form of a sulphonated tolylether/formaldehyde condensate and a commercially available surfactant product consisting of 1 mole of tristyryl phenol and 16 moles of ethylene oxide are both present in the composition, there is a considerable improvement over compositions which contain only one of these two components. This can be seen by comparing for example Application Examples 14 and 16. Accordingly in Application Example 14 both the sulphonated tolylether/formaldehyde condensate and the surfactant are present, whereas in Application Example 16, there is no surfactant. The maximum pressure difference between the inside and outside of the bobbin is much greater in the case of Example 16 than in the case of Example 14. Such high differences in internal/external pressure in the case of Application Example 16, is attributed to the instability of the U.V.-containing dispersion, which agglomerates to or forms deposits on the internal surface of the bobbin, thus leading to an increase in the internal/external pressure difference. By comparing the other parameters measured, one also sees the clear superiority of the dispersion used in Application Example 14 over that of Application Example 16.

A similar comparison between the results of Application Example 17 (which contains no sulphonated tolylether/formaldehyde condensate and contains the minimum quantity of the surfactant in order to obtain a mean particle diameter of 1 μm) and either Application Example 14 or Application Example 15, shows again that a composition of the present invention in which both a dispersing agent and a surfactant are present demonstrates superior characteristics over a comparable composition which does not contain the dispersing agent.

EXAMPLES OF COMPOSITION (C)

Example 19

The following are mixed together in a vessel:

25.00 parts of 2-(2'-hydroxy-3'-tert.butyl-5'-methylphenyl)-5-chlorobenzotriazole;

18.00 parts of a commercially available condensation product of ditolylether sulphonate and formaldehyde (Baykanol SL);

1.20 parts of commercially available Pluronic P 75;

1.5 parts of a commercially available addition product of 1 mole of a mixture of fat alcohols having 14–18 carbon atoms and 40 moles of ethylene oxide;

1.00 part of a commercially available wetting agent (Sandozin NIT fl);

0.20 parts of a commercially available conservation agent (GivGard);

0.05 parts of NaOH; and 53.05 parts of water.

The mixture is then milled in a bead mill as in Example 1.

The resulting concentrate is stable as a dispersion for 2 days at a temperature of about 50° C.

Example 20

Example 19 is repeated using:

40.00 parts of 2-(2'-hydroxy-3'-tert.butyl-5-methylphenyl)-5-chlorobenzotriazole;

10.14 parts of a commercially available condensation product of ditolylether sulphonate and formaldehyde;

1.16 parts of commercially available Pluronic P 75;

2.4 parts of a commercially available product of 1 mole of a mixture of fat alcohols having 14–18 carbon atoms and 40 moles of ethylene oxide;

1.01 parts of a commercially available wetting agent (Sandozin NIT fl);

0.28 parts of a commercially available conservation agent (GivGard);

0.07 parts of NaOH; and 44.94 parts of water.

Example 21

Example 19 is repeated, omitting to add the commercially available addition product of 1 mole of a mixture of fatty alcohols having 14 to 18 carbon atoms and 40 moles of ethylene oxide, and using 54.55 parts water.

Example 22

Example 20 is repeated omitting to add the commercially available addition product of 1 mole of a mixture of fatty alcohols having 14 to 18 carbon atoms and 40 moles of ethylene oxide, and using 47.34 parts water.

APPLICATION EXAMPLES (EXAMPLES 23–28)

Application Example (Example 23)

A dyebath is prepared using the following components:

0.75% C.I. Disperse Red 74;

0.75% of the dispersion of Example 19; and 98.5% water.

The pH is brought to 5.0 by the addition of ammonium sulphate/formic acid in a ratio of 10:1. The dyebath is then warmed as in Example 10 above and the dyeing procedure according to Example 10 is followed.

The light fastness of the dyed fabric is substantially better than that dyed without the benzotriazole present.

Instead of using 0.75% of the dispersion of Example 19, Example 23 can be repeated using 0.50% of the dispersion of Example 20.

Example 24

Using a fine polyester yarn (Dtex 167fl), a small cross-wound bobbin of 40 g is produced as in Example 11 above. This bobbin is dyed according to the dyeing conditions of Example 11.

A goods-to-liquor ratio of 1:10, with water of 11° d (German Hardness) is employed.

Each of the dyestuff combinations comprises:

0.19% C.I Disperse Yellow 86

0.185% C.I Disperse Yellow 42

0.122% C.I Disperse Red 91

0.49% C.I Disperse Blue 77 and 3.5% of the dispersion of example 19.

The dispersions are evaluated as in Examples 11–18 above.

Application Example 25

Application Example 24 is repeated using 2.18% of the dispersion of example 21, instead of 3.5% of the dispersion of example 19.

Application Example 26

Application Example 24 is repeated using 2.18% of the dispersion of example 20, instead of 3.5% of the dispersion of example 19.

Application Example 27

Application Example 24 is repeated using 2.18% of the dispersion of example 22, instead of 3.5% of the dispersion of example 19.

The results obtained from application examples 24–27 may be seen from the following Table 2.

TABLE 2

| Application Ex. No. | Dispersion | $P_{max}$ | $F_{min}$ | E | A |
|---|---|---|---|---|---|
| 24 | Example 19 | 0.1 | 0.6 | very good | no |
| 25 | Example 21 | 0.8 | 0.05 | bad | yes |
| 26 | Example 20 | 0.1 | 0.6 | very good | no |
| 27 | Example 22 | 0.75 | 0.05 | bad | yes |

As can be seen from the table, the presence in the dispersion of a sulphonated tolylether/formaldehyde condensate and a commercially available product consisting of an addition product of 1 mole of a mixture of fat alcohols with 14–18 carbon atoms and 40 moles of ethylene oxide (Application Examples 24 and 26), causes a considerable improvement over dispersions which contain only the sulphonated tolylether/formaldehyde condensate (Application Examples 25 and 27), that is no addition product.

We claim:

1. A composition comprising, based on the total weight of said composition:
   a) 20–45% of a insoluble or sparingly soluble U.V. absorber of the 2-(2'-hydroxyphenyl)-benzotriazole series having an average particle size of less than 5 µm;
   b) 7 to 25% of a dispersing agent which is a condensation product of a sulphonated tolylether and formaldehyde;
   c) 0.5 to 10% of a non-ionic surfactant which is:
      1) an addition product of an ethylene and/or propylene oxide with tri or di styryl phenol;
      2) an addition product of an ethylene and/or propylene oxide with a fatty alcohol;
      3) a blend of 1) and an addition product of an ethylene and/or propylene oxide with a $_{13}$poly alkylene glycol;
      4) a blend of 2) and an addition product of an ethylene and/or propylene oxide with a $_{13}$poly alkylene glycol;
   d) and water;

and optionally, one or more of the following:
   e) up to 1.6% of a solubilizing agent
   f) 0.1 to 0.2% of a buffer
   g) 0.1 to 0.3% of an antifouling agent
   h) 0.1 to 1.0% of an antifoamimg agent.

2. A composition claimed in claim 1 wherein the average particle size of the U.V. absorber is less than 1 µm.

3. A composition as claimed in claim 1 comprising:
   a) 20 to 45% of an insoluble or sparingly soluble U.V. absorber of the 2-(2'-hydroxyphenyl)-benztriazole series having an average particle size of less than 5 µm;
   b) 7 to 20% of a dispersing agent which is a condensation product of a sulphonated tolylether and formaldehyde;
   c) 1 to 6% of a non-ionic surfactant which is an addition product of ethylene oxide or propylene oxide or both ethylene and propylene oxide and tristyrylphenol;
   d) and water.

4. A composition claimed in claim 3 wherein the average particle size of the U.V. absorber is less than 1 µm.

5. A composition as claimed in claim 1 comprising:
   a) 20 to 45% of an insoluble or sparingly soluble U.V. absorber of the 2-(2-hydroxyphenol)-benztriazole series having an average particle size of less than 5 µm;
   b) 7 to 25% of a dispersing agent which is a condensation product of sulphonated tolylether and formaldehyde;
   c) 0.5 to 10% of a non-ionic surfactant which is an addition product of 1 mole of fatty alcohols with 14–18 carbon atoms and 10–50 moles ethylene oxide or propylene oxide, or a total of 10–50 moles ethylene oxide and propylene oxide;
   d) and water.

6. A composition claimed in claim 5 wherein the average particle size of the U.V. absorber is less than 1 µm.

7. A process for dyeing, padding or printing a substrate comprising applying to the substrate 0.01 to 5% of a dye and 0.5 to 6% of a composition according to claim 1, the percentages being based on the weight of the substrate to be dyed, padded or printed.

8. A process in which a substrate which has been dyed, padded or printed according to a conventional dyeing, padding or printing process, wherein subsequent to said dyeing, padding or printing process, a composition as claimed in claim 1, is applied in an amount sufficient to improve the substrate's UV light stability.

* * * * *